(12) United States Patent
Ribardo, Jr.

(10) Patent No.: US 10,356,343 B2
(45) Date of Patent: Jul. 16, 2019

(54) METHODS AND SYSTEM FOR GEOMETRIC DISTORTION CORRECTION FOR SPACE-BASED ROLLING-SHUTTER FRAMING SENSORS

(71) Applicant: RAYTHEON COMPANY, Waltham, MA (US)

(72) Inventor: Thomas G. Ribardo, Jr., Garland, TX (US)

(73) Assignee: RAYTHEON COMPANY, Waltham, MA (US)

( * ) Notice: Subject to any disclaimer, the term of this patent is extended or adjusted under 35 U.S.C. 154(b) by 284 days.

(21) Appl. No.: 15/461,651

(22) Filed: Mar. 17, 2017

(65) Prior Publication Data
US 2017/0272668 A1     Sep. 21, 2017

Related U.S. Application Data

(60) Provisional application No. 62/310,194, filed on Mar. 18, 2016.

(51) Int. Cl.
*H04N 7/18*     (2006.01)
*H04N 5/353*    (2011.01)

(52) U.S. Cl.
CPC .................. *H04N 5/3532* (2013.01)

(58) Field of Classification Search
CPC ............. H04N 5/3675; H04N 5/23264; H04N 5/2329; H04N 5/3532; G06T 3/00; G06T 3/0068; G06T 3/0056; G06F 16/4393

USPC ............. 382/278, 305; 348/241, 208.1, 147; 709/240

See application file for complete search history.

(56) References Cited

U.S. PATENT DOCUMENTS

| | | | |
|---|---|---|---|
| 8,471,915 B2 * | 6/2013 | Robinson | G06T 3/00 348/208.1 |
| 2009/0063703 A1 * | 3/2009 | Finkelstein | G06F 16/4393 709/240 |
| 2012/0307084 A1 * | 12/2012 | Mantzel | H04N 5/23248 348/208.2 |
| 2013/0163896 A1 * | 6/2013 | Chen | G06T 3/0068 382/278 |
| 2014/0218569 A1 * | 8/2014 | Tsubaki | H04N 5/2329 348/241 |
| 2015/0242440 A1 * | 8/2015 | Zombo | G06T 3/0056 382/305 |
| 2016/0358321 A1 * | 12/2016 | Xu | G06T 7/0002 |

(Continued)

*Primary Examiner* — Gims S Philippe
(74) *Attorney, Agent, or Firm* — Lando & Anastasi, LLP

(57) ABSTRACT

Aspects and embodiments are generally directed to an imaging system and methods for correcting geometric distortion induced by rolling-shutter operation of framing sensors. In one example, a method includes the acts of developing a DtoN mapping from a distorted image space to a normalized image space for initial pixels of the rolling-shutter framing sensor, developing an NtoD mapping from the normalized image space to the distorted image space for repositioned pixels in the normalized image space based on the DtoN mapping, the repositioned pixels corresponding to the initial pixels of the rolling-shutter framing sensor, producing a normalized image based on the repositioned pixels and the NtoD mapping, and resampling the normalized image to produce a corrected image of the imagery collected by the rolling-shutter framing sensor.

17 Claims, 16 Drawing Sheets

(56) References Cited

U.S. PATENT DOCUMENTS

2016/0360081 A1* 12/2016 Tsubaki ............. H04N 5/23264
2017/0070692 A1* 3/2017 Lin ...................... H04N 5/3675

* cited by examiner

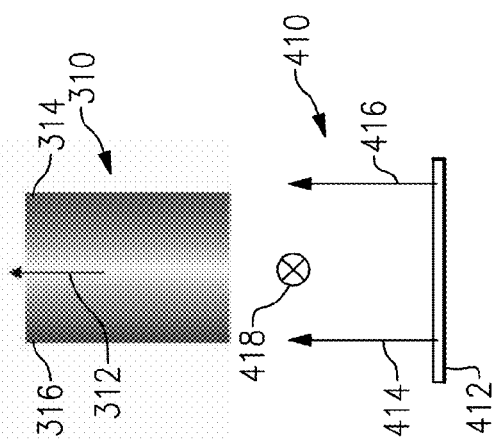
FIG.4
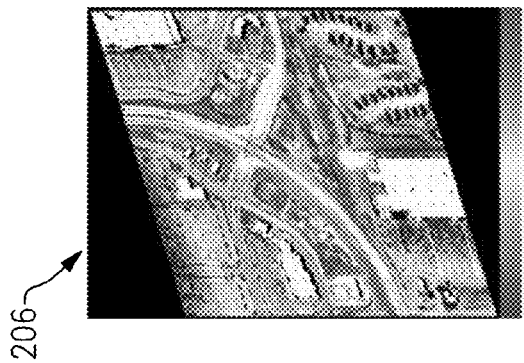
FIG.3
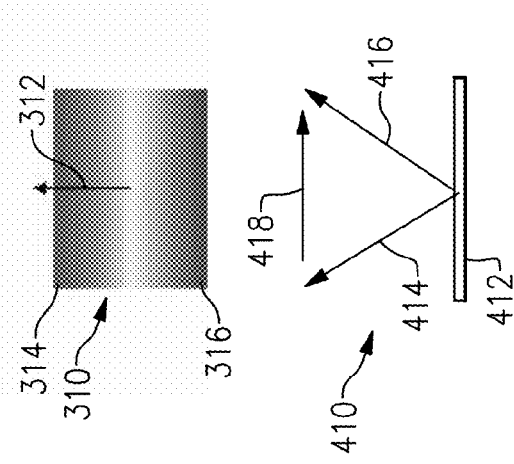
FIG.2
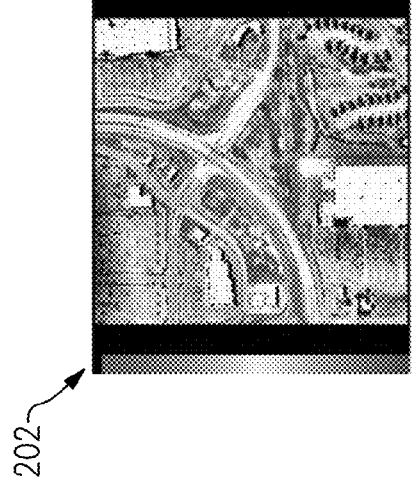

METHODS AND SYSTEM FOR GEOMETRIC DISTORTION CORRECTION FOR SPACE-BASED ROLLING-SHUTTER FRAMING SENSORS

CROSS-REFERENCE TO RELATED APPLICATIONS

This application claims priority under 35 U.S.C. § 119(e) to U.S. Provisional Application Ser. No. 62/310,194, titled "METHODS AND APPARATUS FOR GEOMETRIC DISTORTION CORRECTION FOR SPACE-BASED ROLLING-SHUTTER FRAMING SENSORS," filed on Mar. 18, 2016, which is hereby incorporated herein by reference in its entirety.

BACKGROUND

Conventional space-based imaging systems use push-broom imaging techniques in which a linear sensor array builds up a full frame image line-by-line as an associated platform moves/scans over a target. In such systems, a certain amount of geometric distortion is present in the final image as a result of the inability to perfectly control the motion of the platform during the scan period. For these push-broom systems, the attitude of the spaced-based platform is directly correlated to the "scan-line". Further, the line-time, platform-velocity, and thus each projected line on the target, are all correlated. As a result, simple "line-time" iteration is generally sufficient to retrieve an unambiguous position of a pixel in the distorted image space, and produce a correction. The correction may then be used to resample the collected image data to obtain a corrected full frame image.

The use of framing sensors on space-based platforms to produce full-motion video is becoming more common. These framing sensors can generally be classified as a "rolling-shutter" type or a "global-shutter" type. Conventional space-based systems using framing sensors utilize "global" shutters, meaning that the entire image frame is captured simultaneously. While global-shutter type sensors produce images that are relatively unaffected by platform motion, global-shutter type sensors are traditionally more costly than rolling-shutter type sensors. Accordingly, rolling-shutter framing sensors are an appealing option for certain applications. However, the use of rolling-shutter framing sensors introduces unique geometric distortion that is more complex than that experienced by traditional push-broom sensors.

SUMMARY OF THE INVENTION

Aspects and examples discussed herein provide an imaging system and associated methods for correcting geometric distortion induced by rolling-shutter operation of high velocity framing sensors. According to certain examples, the imaging system is configured to generate a DtoN_map (distorted image space to normalized image space) based on electromagnetic radiation received at an imaging array during a rolling-shutter image frame, and use the DtoN_map to seed a search for the bounding line-times of each desired idealized pixel in a normalized image space. Ambiguity in the pixel position may be reduced through the identification of two (or more) possible positions relative to two (or more) distinct line-times and positions, and the average calculation (weighted or unweighted) of the two (or more) possible positions for a best approximation for the pixel location. The best approximation can then be used by the imaging system to perform interpolation and resampling to produce a corrected image.

As further described herein, various examples of the imaging system and methods improve the executional efficiency and accuracy of distortion correction operations when compared to current techniques. Moreover, described examples of the methods permit the use of a rolling-shutter framing sensor on satellite-based platforms, which may decreases the size, weight, and cost of the platform when compared to platforms with non-framing linear-array/push-broom sensors.

According to an aspect, provided is a method of correcting for geometric distortion in imagery collected by a rolling-shutter framing sensor. In one example, the method comprises developing a DtoN mapping from a distorted image space to a normalized image space for initial pixels of the rolling-shutter framing sensor, developing an NtoD mapping from the normalized image space to the distorted image space for repositioned pixels in the normalized image space based on the DtoN mapping, the repositioned pixels corresponding to the initial pixels of the rolling-shutter framing sensor, producing a normalized image based on the repositioned pixels and the NtoD mapping, and resampling the normalized image to produce a corrected image of the imagery collected by the rolling-shutter framing sensor.

According to various examples, developing the DtoN mapping includes mapping a geodetic location of each ground-point in a ground reference to at least one of the repositioned pixels. In one example, developing the DtoN mapping includes projecting each of the initial pixels from the distorted image space to the ground reference, and projecting each of the initial pixels from the ground reference onto an idealized focal plane in the normalized image space. In various examples, the idealized focal plane is positioned at a mean ephemeris and altitude of the imagery collected by the rolling-shutter framing sensor. According to at least one example, the idealized focal plane has an instantaneous exposure to each of the initial pixels of the rolling-shutter framing sensor.

In various examples, the method further comprises collecting the initial pixels by exposing sequential lines of the rolling-shutter framing sensor over a frame time, each line being exposed at a corresponding line-time. In a further example, developing the NtoD map includes determining a nearest line-time corresponding to each of the repositioned pixels based on the DtoN mapping, projecting each of the repositioned pixels to the ground reference and back to a distorted focal plane in the distorted image space at the nearest line-time to provide a first estimated pixel position in the distorted image space, determining a next-nearest line-time corresponding to each of the repositioned pixels based on the DtoN mapping, and projecting each of the repositioned pixels to the ground reference and back to the distorted focal plane in the distorted image space at the next-nearest line-time to provide a second estimated pixel position.

According to certain examples, the method may further comprise averaging the first estimated pixel position and the second estimated pixel position to produce an approximate position for each repositioned pixel on the distorted focal plane. In at least one example, resampling the normalized image to produce the corrected image includes bicubic resampling the normalized image.

According to certain aspects, provided is a spaced-based platform imaging system. In one example, the spaced-based imaging system comprises an imaging array having an array of pixels arranged in a series of independently addressable lines, the imaging array being configured to sequentially activate each line of pixels to collect and integrate photons of electromagnetic radiation received at the imaging array, a read-out integrated circuit (ROIC) coupled to the imaging array and configured to deactivate each sequentially activated line of pixels and read out a value of the pixels therein, and a control system coupled to the read-out integrated circuit to receive the value of each pixel and generate imagery based on the received electromagnetic radiation. The control system may include a digital signal processor configured to develop a DtoN mapping from a distorted image space to a normalized image space for initial pixels of the imaging array, develop an NtoD mapping from a normalized image space to the distorted image space for repositioned pixels in the normalized image space based on the DtoN mapping, the repositioned pixels corresponding to the initial pixels of the imaging array, produce a normalized image based on the repositioned pixels and the NtoD mapping, and resample the normalized image to produce a corrected image of the imagery generated based on the received electromagnetic radiation.

In various examples, the imaging array is a rolling-shutter framing sensor. According to certain examples, in developing the DtoN mapping, the digital signal processor is configured to map a geodetic location of each ground-point in a ground reference to each of the repositioned pixels. In at least one example, in developing the DtoN mapping, the digital signal processor is configured to project each of the initial pixels from the distorted image space to the ground reference, and project each of the initial pixels from the ground reference onto an idealized focal plane in the normalized image space. The idealized focal plane may be positioned at a mean ephemeris and altitude of the electromagnetic radiation collected by the imaging array. In one example, the idealized focal plane has an instantaneous exposure to each of the initial pixels of the imaging array.

According to certain examples, the imaging array is further configured to sequentially activate each line of pixels for a corresponding line-time. In at least one example, in developing the NtoD mapping, the digital signal processor is configured to determine a nearest line-time corresponding to each of the repositioned pixels using the DtoN mapping, project each of the repositioned pixels to the ground reference and back to a distorted focal plane in the distorted image space at the nearest line-time to provide a first estimated pixel position, determine a next-nearest line-time corresponding to each of the repositioned pixels using the DtoN mapping, and project each of the repositioned pixels to the ground reference and back to the distorted focal plane at the next-nearest line-time to provide a second estimated pixel position.

In various examples, the digital signal processor is further configured to average the first estimated pixel position and the second estimated pixel position to produce an approximate position for each repositioned pixel on the distorted focal plane. In at least one example, the digital signal processor is further configured bicubic resample the normalized image to produce the corrected image.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures:

FIGS. 2-4 illustrate examples of geometric distortions caused by rolling-shutter operation of a framing sensor located on a moving platform;

DETAILED DESCRIPTION

Aspects and embodiments are directed to methods and imaging systems for correcting geometric distortions in imagery collected using a framing sensor with a rolling-shutter. In various examples, the imaging system is configured to attach to a moving platform, such as a space-based moving platform. In one specific example, the moving platform is a satellite.

Figure 1:
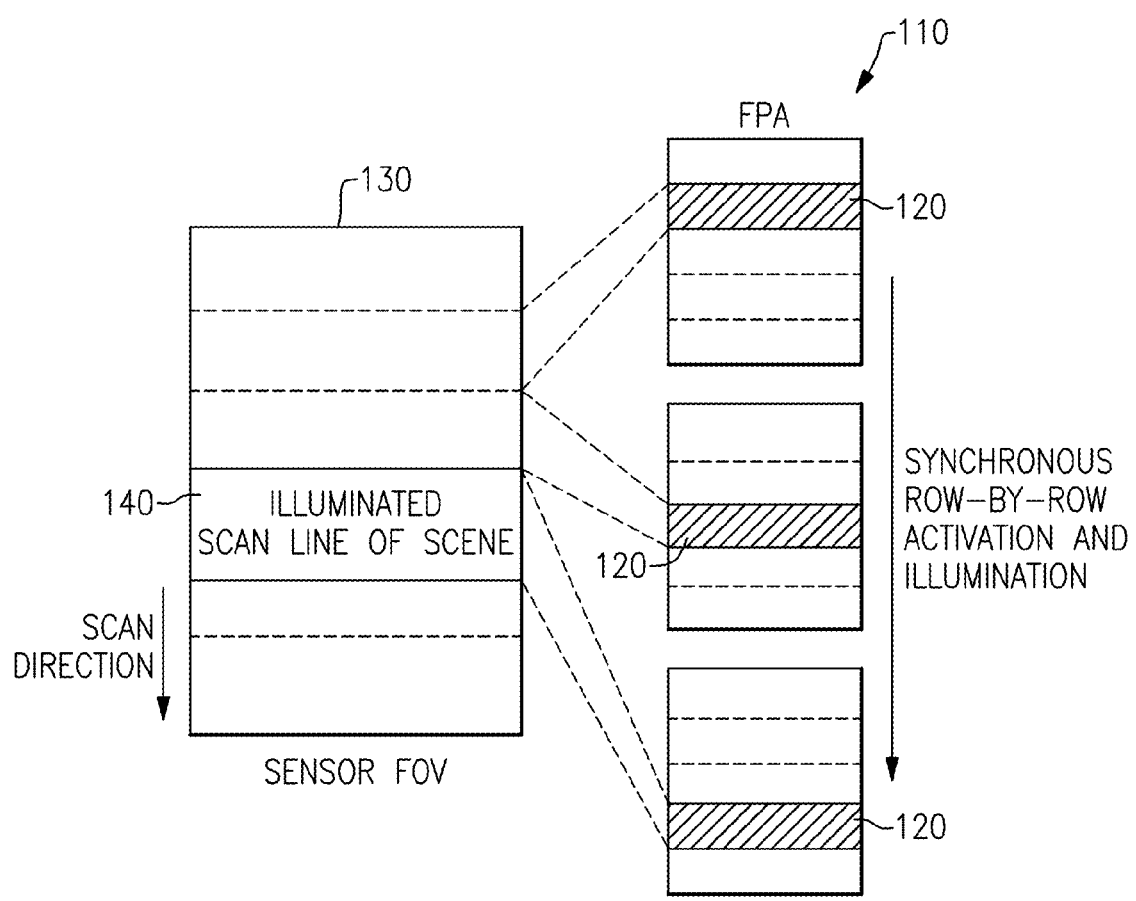
FIG. 1 is a diagram illustrating operation of an imaging system including a rolling-shutter framing sensor.

Rolling-shutter framing sensors offer a less expensive alternative to full framing sensors and are well suited to small, low-power satellites, such as "cube-sat" designs. FIG. 1 is a diagram illustrating an example of rolling-shutter operation of an imaging array, such as a focal plane array (FPA) 110. The focal plane array 110 includes a plurality of pixels arranged in a series of lines 120. In rolling-shutter operation, a read-out integrated circuit (ROIC; not shown in FIG. 1) is configured to activate one or more lines 120 of the focal plane array 110 during an integration time in a sequential, line-by-line manner. When a line 120 is activated, the pixels (also sometimes called unit cells or samples) of the line 120 are configured to collect and integrate photons of received light. After the integration time, the ROIC is configured to deactivate the line 120 and read out values of each of the pixels for subsequent image generation, while the next line is activated. The image 130 is built line by line by progressive scans 140. In one example, once all the lines 120 of the focal plane array 110 are read out (i.e., a frame scan is completed), the output image 130 may be generated by combining the integration results of each line 120. Thus, a new output image 130 may be generated for each frame. Alternatively, the output image 130 may be updated in a line-by-line manner (i.e., after each line 120 is read out).

The rolling-shutter operation may use significantly reduced power compared to full framing sensor operation (also called "staring" detector operation), and may therefore be desirable to use in many applications, including spaced-based imaging systems. However, the rolling-shutter operation can introduce unwanted geometric-distortions when the sensor is in motion relative to a target. These geometric distortions are greatly increased with the speed difference between the target and the platform as observed by the space-based sensors when in orbit.

As discussed above, in performing distortion correction, typical push-broom systems that utilize linear array sensors take advantage of the fact that the line-time, platform-velocity, and each projected line on the target, are all correlated. This allows the push-broom system to perform an iterative-search over a single variable, namely, time. However, with a rolling-shutter-type framing sensor this direct correlation does not exist. For a rolling-shutter type framing sensor the spacing between lines is not solely defined by the platform velocity (angular and linear), but by the combined projected-line-scan-velocity of the framing-sensor and the ground-projected angular/linear velocity of the platforms line-of-site. Accordingly, an attempt at a line-time iteration process for correcting image distortion in a rolling-shutter framing sensor would require a multi-dimensional search to determine the best approximate point on the distorted focal plane to resample the distorted imagery.

Certain aspects and embodiments are directed to methods and imaging systems for correcting geometric distortions in imagery collected from space-based sensors utilizing rolling-shutter operation. As further described below, certain examples of the methods involve the creation of a mapping from a desired normalized image space to the distorted image space at which the distorted imagery is collected. The mapping can be used to transform the imagery collected into a corrected image that approximates or "looks like" a corresponding image taken with a full (global shutter) framing sensor on a stationary platform.

It is to be appreciated that embodiments of the systems and apparatuses discussed herein are not limited in application to the details of construction and the arrangement of components set forth in the following description or illustrated in the accompanying drawings. The systems and methods are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

As discussed above, the action of a rolling-shutter framing sensor introduces geometric distortions that must be compensated in order to produce an image capable of being analyzed and exploited. FIGS. 2-4 illustrate three general types of distortion that may occur under different operating conditions of an imaging array (e.g., a rolling-shutter framing sensor) on a moving platform. FIGS. 2-4 simulate a space-based platform at an altitude of 250 km above a target and moving at a velocity of 7.643 km/second. The images 202, 204, 206 are an expanded view of a center of the imaging array covering the same sub-region of the ground to better illustrate the general types of distortion present in the imagery.

In each of the examples illustrated in FIGS. 2-4, a target (control-point) is at nadir at a first line of imagery collection by the imaging array. A first gradient rectangle 310 in each case illustrates the orientation of a focal plane of the imaging array relative to the imagery collected. A first region 314 of the gradient rectangle 310 represents the beginning of the rolling-shutter period and a second region 316 represents the end. The arrow indicator 312 represents the velocity of the platform relative to the focal plane as it images the ground. The directional diagram 410 in each of FIGS. 2-4 illustrates the collection geometry from a side-view perspective of the imaging array relative to the ground 412. Within the directional diagram 410, the arrow indicator 414 represents the platform position and Line-of-Sight (LOS) at the beginning of the imaging operations a frame period, and the arrow indicator 416 represents the position of the platform and the LOS at the end of the imaging operations of that frame period.

Referring to FIG. 2 illustrated is an ideal case in which the platform attitude is controlled such that the imaging array is targeting a single control-point on the ground 412 throughout the entire frame period. Under this type of control, the ground-projected-velocity of the platform is zero at the center of the image 202 and minimized at the edges of the image 202. This results in minimum overall distortion of the image 202. However, in cases where a good ground point is unavailable, increased distortion may nevertheless be present in the image 202.

Referring to FIG. 3, illustrated is a case in which optics of the platform are pointed at nadir throughout the entire frame period. As illustrated, this results in a compression of the image 204 when the platform attitude is positioned such that the line-rate is parallel to the ground-projected-velocity, and therefore the overall-velocity is effectively reduced by the line-rate. If the focal plane of the imaging array is turned 180° about the line-of-sight (LOS) of the platform such that the ground-projected-velocity is additive to the line-rate, then the image 204 is stretched rather than compressed.

Referring to FIG. 4, illustrated is a case in which the direction of the line-rate is perpendicular to the ground-projected-velocity of the platform. Similar to FIG. 3, the imaging array is locked at nadir throughout the entire frame period. In FIG. 4, the indicator "X" 418 signifies a platform velocity in a direction perpendicular to the line-rate (e.g., into the page). Accordingly, imaging in the manner illustrated in FIG. 4 may result in a "skewed" distortion of the image 206, as shown in FIG. 4.

Those skilled in the art will appreciate that any number of in-between conditions can exist in addition to the three example cases shown in FIGS. 2-4. For the purposes of the methods and imaging systems described herein, methods to address applications similar to the three cases illustrated in FIGS. 2-4 are described. However, various other examples may address other conditions and are within the scope of this disclosure.

Accordingly, aspects and embodiments are directed to imaging systems and methods that provide the ability to correct for distortion introduced by movement of a rolling-shutter framing sensor attached to a space-based platform. As discussed in more detail below, particular examples of the methods may include a method of disambiguating pixels collected from different shutter times to correct image distortion. For space-based applications, the methods disclosed herein may leverage rolling-shutter rate, platform ephemeris, and attitude during the time of collection. Further examples may utilize an accurate optical model of the optical system associated with the imaging system and space-based platform. Often these dependencies are readily available and accessible for a space-based imaging platform, and may improve the accuracy and efficiency of the methods described herein.

Figure 5:
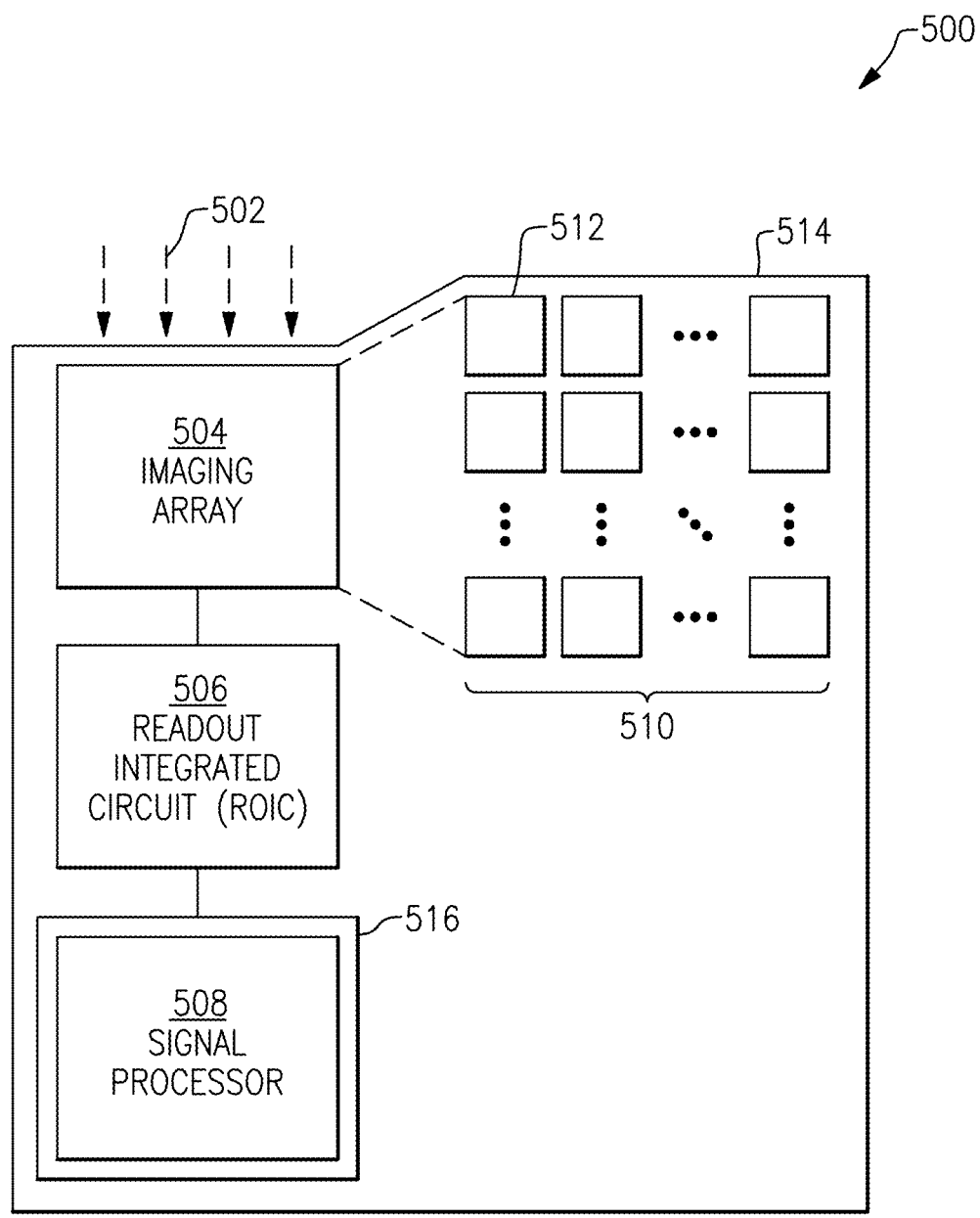
FIG. 5 is a block diagram of an imaging system according to various examples discussed herein.

FIG. 5 is a block diagram of an imaging system 500 according to various examples discussed herein. In particular, the imaging system 500 may be configured to be disposed on a moving platform, and in particular, a space-based moving platform, such as a satellite. The imaging system 500 includes an imaging array 504, such as the illustrated focal plane array (FPA). In one particular example, the imaging array 504 is a rolling-shutter based framing sensor. The imaging array 504 includes a plurality of pixels 512 arranged in a pixel array 510 of rows and columns (e.g., lines and samples). When activated, each pixel 512 of the imaging array 510 is designed to collect and integrate photons of electromagnetic radiation impinging on that respective pixel. A circuit within each pixel 512 accumulates charge corresponding to the flux of incident electromagnetic radiation during the period of activation of the pixel 512. The imaging system 500 further includes a read-out integrated circuit (ROIC) 506 coupled to the imaging array 504, a control system 516 including at least a processor (e.g., a digital signal processor 508) coupled to the ROIC 506, and a housing 514 configured to couple the imaging system 500 to the moving platform, such as the satellite. A more detailed illustration of one example the control system 516 is described with reference to FIG. 6.

As discussed in one example, the imaging array 504 is a rolling-shutter framing sensor. In such an example, the imaging array 504 is configured to sequentially activate each line of pixels 512 within the array 510 to collect and integrate photons of electromagnetic radiation received at the imaging array 504. As discussed herein, each line is activated during a "line-time." When a line is activated, the pixels within that line integrate the received electromagnetic radiation. After the integration time, the ROIC 506 deactivates the activated line of pixels 512 and reads out a value of each pixel 512 within the deactivated line for subsequent image generation. While one line of pixels 512 is deactivated the imaging array may activate the next line. Accordingly, the imaging system 500 may build a full image frame line-by-line of the imaging array 504, each line including a plurality of pixels read out from the imaging array 504. While in one example, "line" may be used to refer to a set of one or more pixels 512 of the imaging array 510 in the horizontal direction of the imaging array 510 (e.g., a row), it may equally refer to a set of pixels of the imaging array 504 in the vertical direction of the imaging array 504 (e.g., a column).

In various examples, each pixel 512 is a photo-sensitive device that accumulates charge (e.g., in a charge coupled device (CCD) sensor) or produces a current and/or voltage (e.g., in a complementary metal oxide semiconductor (CMOS) sensor) in response to electromagnetic radiation incident upon that pixel 512. Each pixel 512 may include, for example, a photovoltaic detector, a barrier device detector, a position sensitive detector (PSD), or other suitable detector. Each pixel 512 may be individually addressed based on a unique address (e.g., a line and a sample value). It is appreciated that in some examples the imaging array 504 may include digital pixels that provide digitized image data to, for example, the ROIC 506. The ROIC 506 is coupled to the imaging array 504 and may receive, for example, the accumulated charge or current and/or voltage signals from the imaging array 504 and digitize the received information for receipt by the digital signal processor 508.

Referring to FIG. 5, the digital signal processor 508 is coupled to the ROIC 506 and receives digitized information from the ROIC 506 representative of the incident electromagnetic radiation 502 on the imaging array 504. The digitized information received from the ROIC 506 may include, for example, compressed image information consistent with various compressive sensing methods. The digital signal processor 508 may reconstruct the captured image, analyze the compressed image information, send the compressed image information to an external system, and/or direct various components of the imaging system 500. The signal processor 508 may include, for example, other functional components such as a video processing unit, a graphics processing unit, an embedded processor, a single instruction, multiple data digital signal processor (SIMD DSP), and internal memory (not shown). It is appreciated that in certain examples the functionality of the signal processor 508 may also be included within and/or performed by ROIC 506.

In at least one example, the digital signal processor 508 is configured to correct for geometric distortions in the imagery collected using the imaging array 504. Various examples of the processes executed by the digital signal processor 508 to correct for geometric distortion are described below with reference to FIG. 7, FIG. 8, FIGS. 9A-9C, FIGS. 10A-10F, and FIG. 11. Accordingly, FIG. 7, FIG. 8, FIGS. 9A-9C, FIGS. 10A-10F, and FIG. 11 are described with continuing reference to the imaging system 500 illustrated in FIG. 5, and the components thereof.

Figure 6:
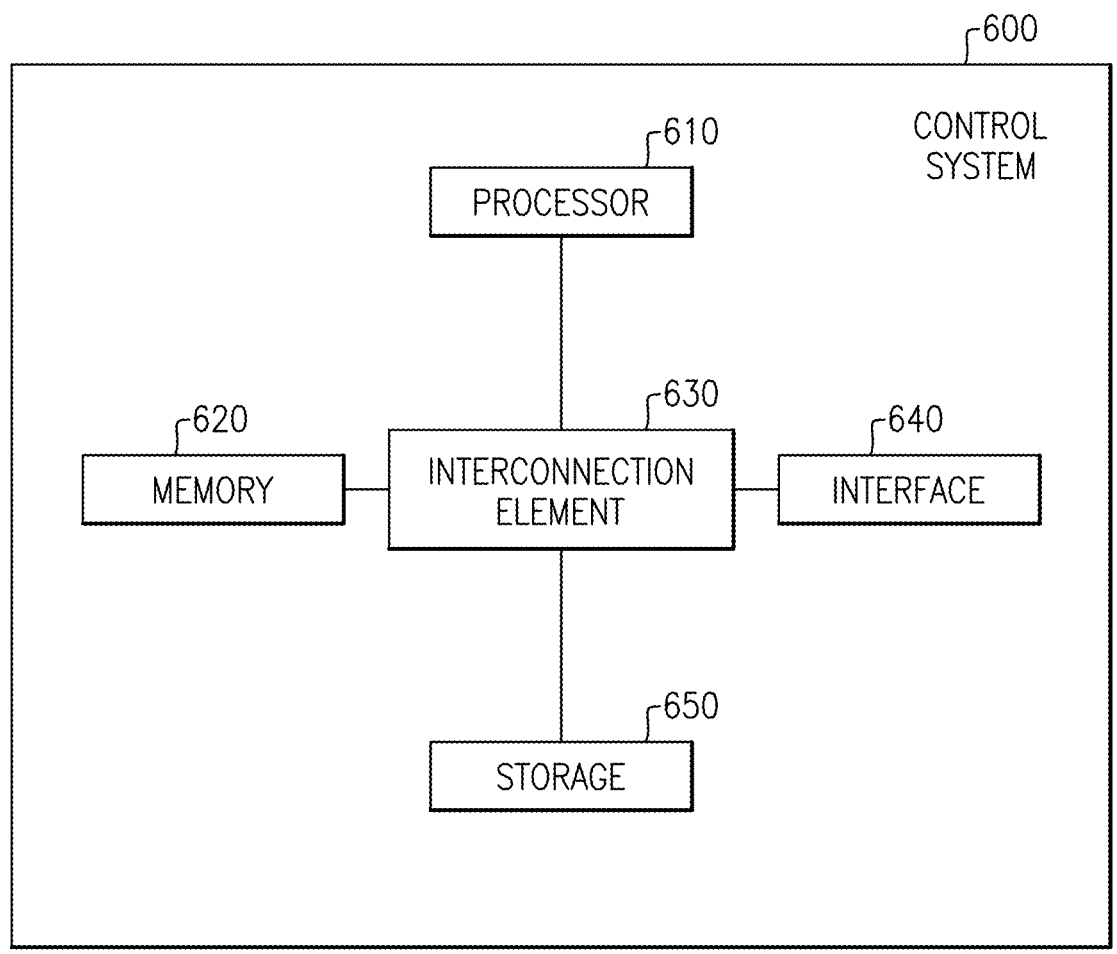
FIG. 6 is a block diagram of a control system for an imaging system, according to various examples discussed herein.

Referring to FIG. 6, there is illustrated a block diagram of a control system 600, in which various aspects and functions described herein may be practiced. As illustrated in FIG. 6, in at least one example the control system 600 includes a processor 610, a memory 620, an interconnection element 630, one or more interface 640, and a data storage element 650. To implement at least some of the aspects, functions, and processes disclosed herein, the processor 610 performs a series of instructions that result in manipulated data. The processor 610 may be any type of processor, multiprocessor, controller, field programmable gate array (FPGA), application specific integrated circuit (ASIC), or digital signal processor (DSP). The processor 610 is connected to other system components, including one or more memory 620 devices, by the interconnection element 630.

The memory 620 may store one or more programs (e.g., sequences of instructions coded to be executable by the processor 610) and/or data, which may include recorded pixels from the imaging array 504, during operation of the imaging system 500 illustrated in FIG. 5. Thus, the memory 620 may be a relatively high performance, volatile, random access memory 620 such as a dynamic random access memory 620 ("DRAM") or static memory 620 ("SRAM"). However, the memory 620 may include any device for storing data, such as a disk drive or other nonvolatile storage device.

Components of the control system 600 are coupled by an interconnection element 630. The interconnection element 630 may include any communication coupling between system components such as one or more physical busses in conformance with specialized or standard computing bus technologies or interfaces, and may include differing technologies to couple to different components. The interconnection element 630 enables communications, including instructions and data, to be exchanged between system components of the control system 600.

The control system 600 also includes one or more interface 640 devices such as input devices, output devices, and combination input/output devices. Interface 640 devices may receive input or provide output. More particularly, output devices may render information for external presentation. Input devices may accept information from external sources. Examples of interfaces 640 may include system interfaces, sensor interfaces, and user interfaces. In one instance, the control system 600 includes a sensor interface that exchanges data, such as pixel values, with the ROIC 506 and/or the imaging array 504 illustrate in FIG. 5. Other examples of interface 640 devices include keyboards, mouse devices, trackballs, microphones, touch screens, printing devices, display screens, speakers, network interface cards, storage devices, etc. Interface 840 devices allow the control system 600 to exchange information and to communicate with external entities, such as users and other systems.

The data storage element 650 includes a computer readable and writeable nonvolatile, or non-transitory, data storage medium in which instructions may be stored that define a program, or other object, that is executed by the processor 610. The data storage element 650 also may include information that is recorded, on or in, the medium, such as recorded pixel values from the ROIC 506 and/or the imaging array 504 (e.g., shown in FIG. 5), and processed by the processor 610 during execution of one or more programs. More specifically, the information may be stored in one or more data structures specifically configured to conserve storage space or increase data exchange performance. The instructions may be persistently stored as encoded signals, and instructions may cause the processor 610 to perform any of the functions described herein. The medium may, for example, be optical disk, magnetic disk or flash memory 620, among others. In operation, the processor 610 or some other controller causes data to be read from the storage element 650 into another memory, such as the memory 620, that allows for faster access to the information by the processor 610 than does the storage medium included in the data storage element 650. A variety of components may manage data movement between the storage element 650 and other memory elements and examples are not limited to particular data management components. Further, examples are not limited to a particular memory system or data storage system.

Although the control system 600 is shown by way of example as one type of control system 600 upon which various aspects and functions may be practiced, aspects and functions are not limited to being implemented on the control system 600 as shown in FIG. 6. Various aspects and functions may be practiced on one or more computers having different architectures or components than that shown in FIG. 6. For instance, the control system 600 may include specially programmed, special-purpose hardware, such as an application-specific integrated circuit ("ASIC") tailored to perform a particular operation disclosed herein. Another example may perform the same operation using a grid of several computing devices running operating systems with various processors and/or several specialized computing devices running proprietary hardware and operating systems.

The control system 600 may be a control system 600 including an operating system that manages at least a portion of the hardware elements included in the control system 600. In some examples, a processor or controller, such as the processor 610, executes an operating system. In other examples the processor 610 may include other forms of logic, such as an ASIC, FPGA, or DSP, and may have other forms of instruction sets, and may or may not execute an operating system.

In some examples, the components disclosed herein may read parameters that affect the functions performed by the components. These parameters may be physically stored in any form of suitable memory including volatile memory (such as RAM) or nonvolatile memory (such as a magnetic hard drive). In addition, the parameters may be logically stored in a propriety data structure (such as a database or file defined by a user mode application) or in a commonly shared data structure (such as an application registry that is defined by an operating system). In addition, some examples provide for both system and user interfaces that allow external entities to modify the parameters and thereby configure the behavior of the components.

As discussed with reference to FIG. 5, in certain examples the digital signal processor 508 is configured to execute a method for correcting the distortion in one or more images generated by the imaging system 500 as a result of movement of a platform on which the imaging system 500 is positioned. Specifically, the digital signal processor 508 may correct a real-time image collected at an image plane of the imaging system 508 by the imaging array 504. As discussed herein, the focal plane of the imaging system 500 is referred to as being positioned in a "distorted image space" as a result of the effects of the rolling-shutter on the moving platform.

In various examples, the digital signal processor 508 may forward project each line of the imaging array 504 to a ground reference, while also propagating platform attitude and motion information corresponding to the line-times of the projected lines. Based on the forward projections, the digital signal processor 508 may generate a forward model in which a geodetic location of each ground-point in the ground reference is mapped to each pixel 512 in a normalized image space. Once determined, the digital signal processor 508 may project each line of the imaging array 504 to an idealized sensor hanging in space at a mean ephemeris and attitude of the imaging operations. Accordingly, the digital signal processor 508 may project each ground point to a "perfect sensor" in the normalized space to generate a map between the distorted image space and the normalized image space (referred to herein as a "DtoN_map" and "DtoN mapping"), and project each line of the imaging array to normalize the image generated by the imaging array 508.

Figure 7:
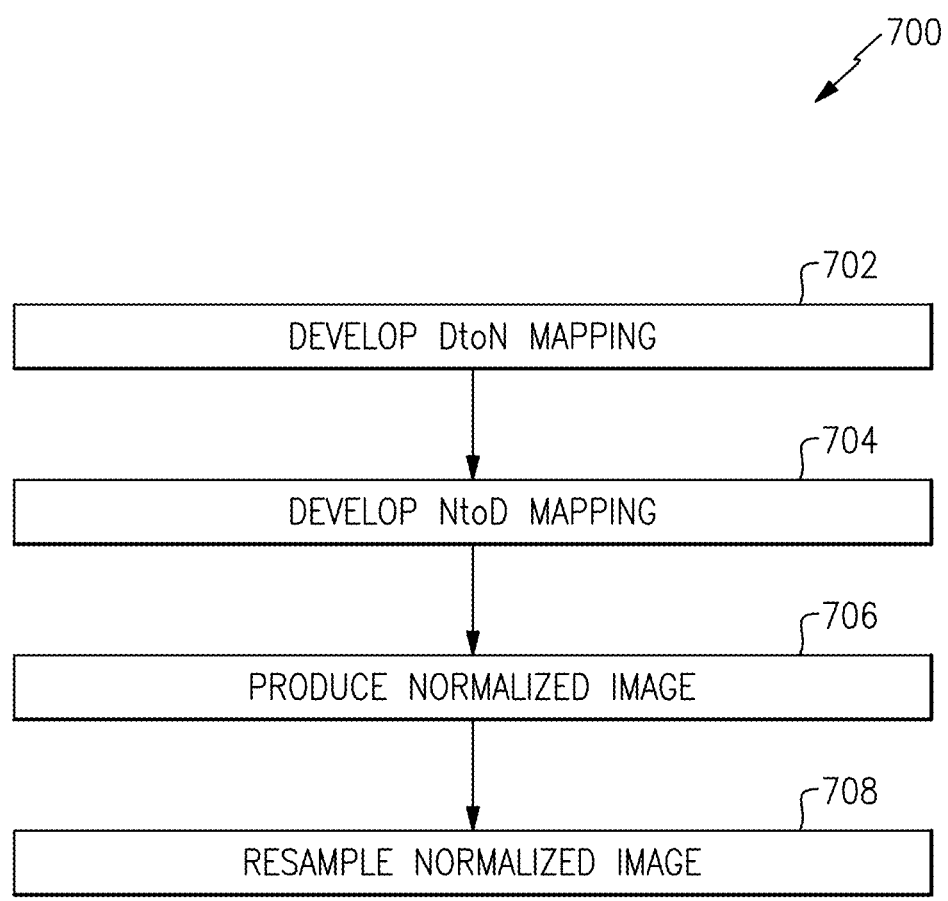
FIG. 7 is a process flow for correcting for geometric distortion in imagery collected by an imaging array, according to various examples discussed herein.

FIG. 7 illustrates a process flow for correcting for geometric distortion in imagery collected by the imaging array 504, according to various examples discussed herein. Acts within the illustrated process 700 may be executed by the control system 516, and in particular, the digital signal processor 508 illustrated in FIG. 5. In act 702, the process 700 may include developing a DtoN mapping from a distorted image space to a normalized image space for initial pixels of the imaging array 504. Following development of the DtoN mapping, the process 700 may include developing an NtoD mapping from the normalized image space to the distorted image space for repositioned pixels in the normalized image space based on the DtoN mapping (act 706). In particular, the repositioned pixels may correspond to the initial pixels of the rolling-imaging array 504. Based on the repositioned pixels and the NtoD mapping, in act 706 the process 700 may include producing a normalized image. The process 700 may then include resampling the normalized image to produce a corrected image of the imagery collected by the imaging array 504 (act 708). Various details and examples of the process 700 and the acts therein are further described below with reference to FIG. 8, FIGS. 9A-9C, FIGS. 10A-10F, and FIG. 11.

It is appreciated that while in some examples the processing operations executed by the digital signal processor 508 are discussed herein in terms of developing, producing, determining, and projecting, to name a few. The equivalent of developing, producing, determining, and/or projecting can be performed by either analog or digital signal processing techniques and are included within the scope of this disclosure.

Figure 8:
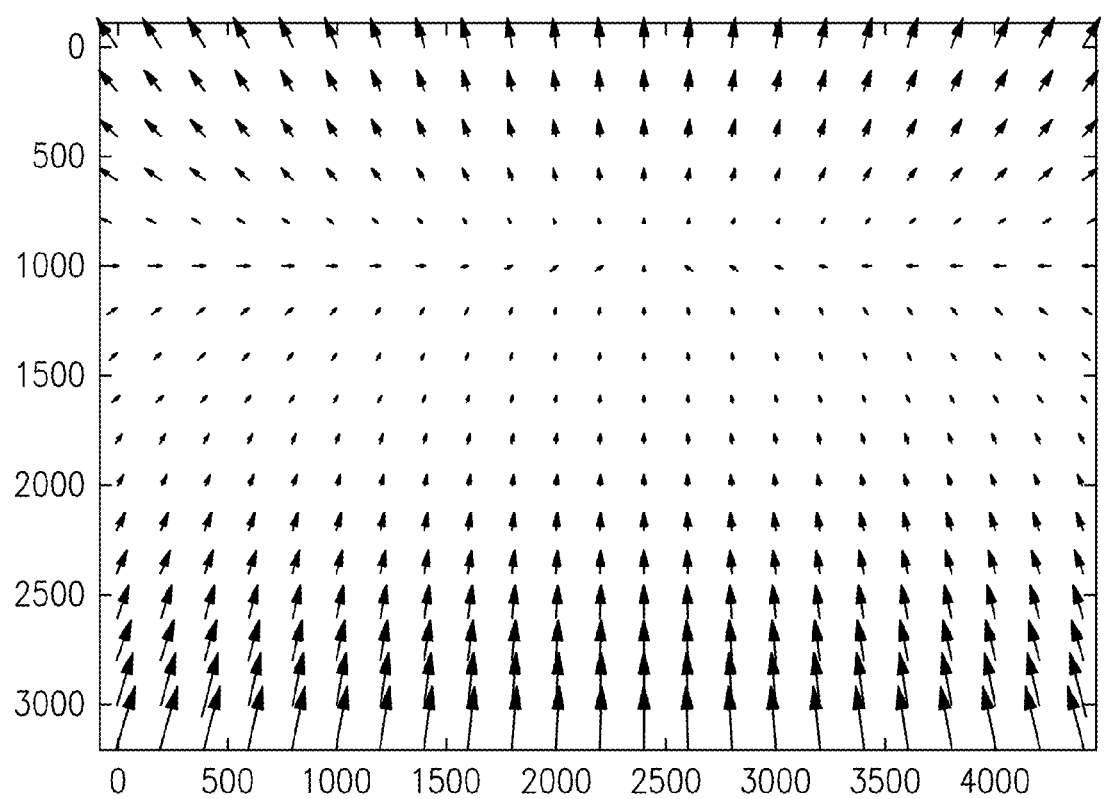
FIG. 8 is an illustration of a DtoN mapping, according to various examples discussed herein.

FIG. 8 is a diagram illustrating one example of a DtoN_map (also referred to herein as a "DtoN mapping") showing initial pixel movement between the distorted-space and the normalized image space. As discussed herein, pixels 512 of the imaging array 504 in the imagery first collected by the imaging array 504, and prior to projecting processes, are referred to as initial pixels. Each arrow indicator within the DtoN_map shows the movement of an initial pixel relative to the other pixels of the imaging array 504, when repositioned in the normalized image space (i.e., a "repositioned pixel"). That is, FIG. 8 illustrates how the digital signal processor moves a distorted initial pixel to produce a normalized image of repositioned pixels It is appreciated that FIG. 8 illustrates a near-ideal image (e.g., image frame) produced by the imaging array 504. The distortion illustrated in FIG. 8 is larger at the bottom of the DtoN_map because the example rolling-shutter scan starts at nadir of the associated platform, and thus angular-velocity increases towards the bottom of the scan.

Figure 9A:
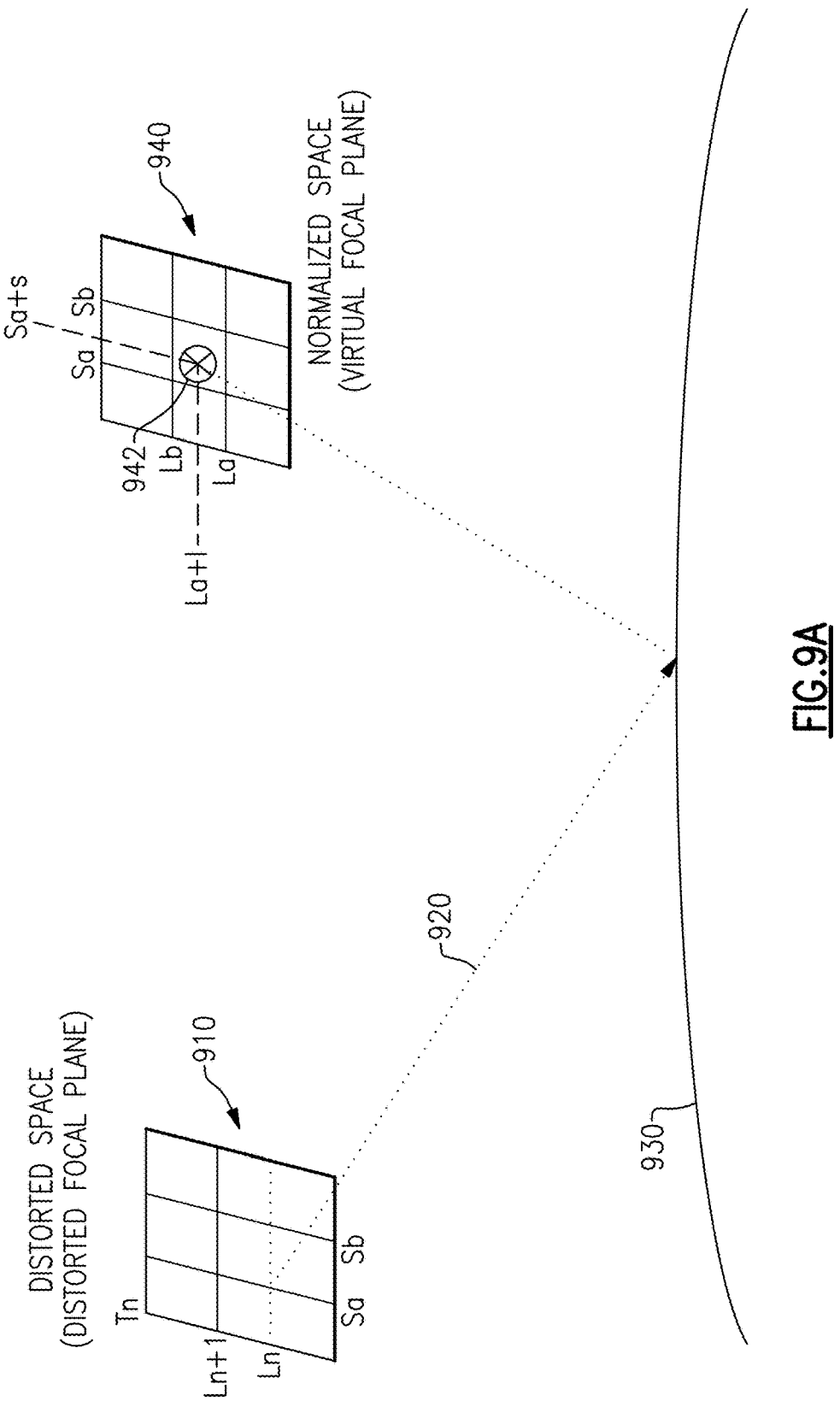
FIGS. 9A-9C illustrate a process for developing a DtoN mapping according to various examples discussed herein.
Figure 9B:
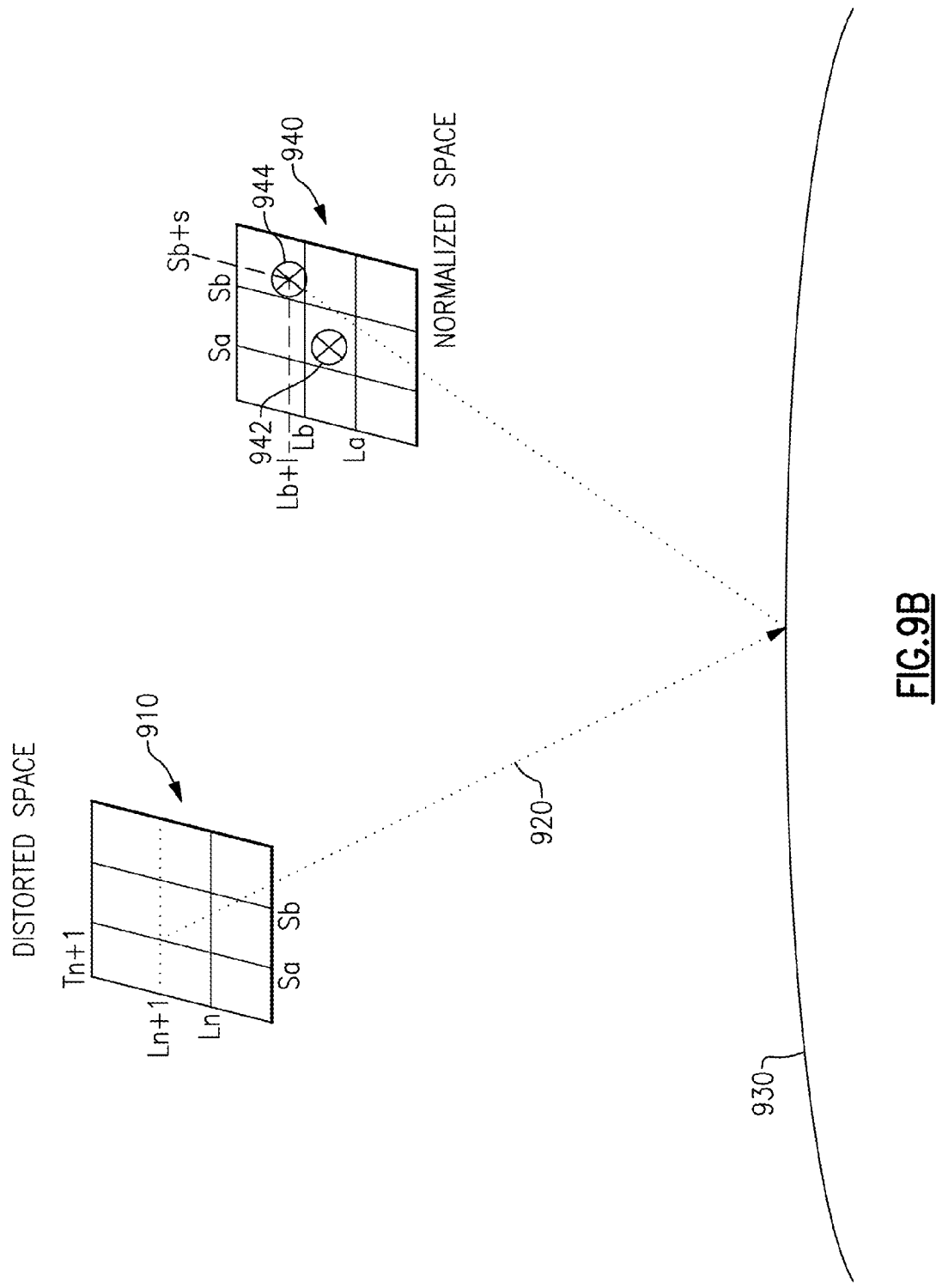
Figure 9C:
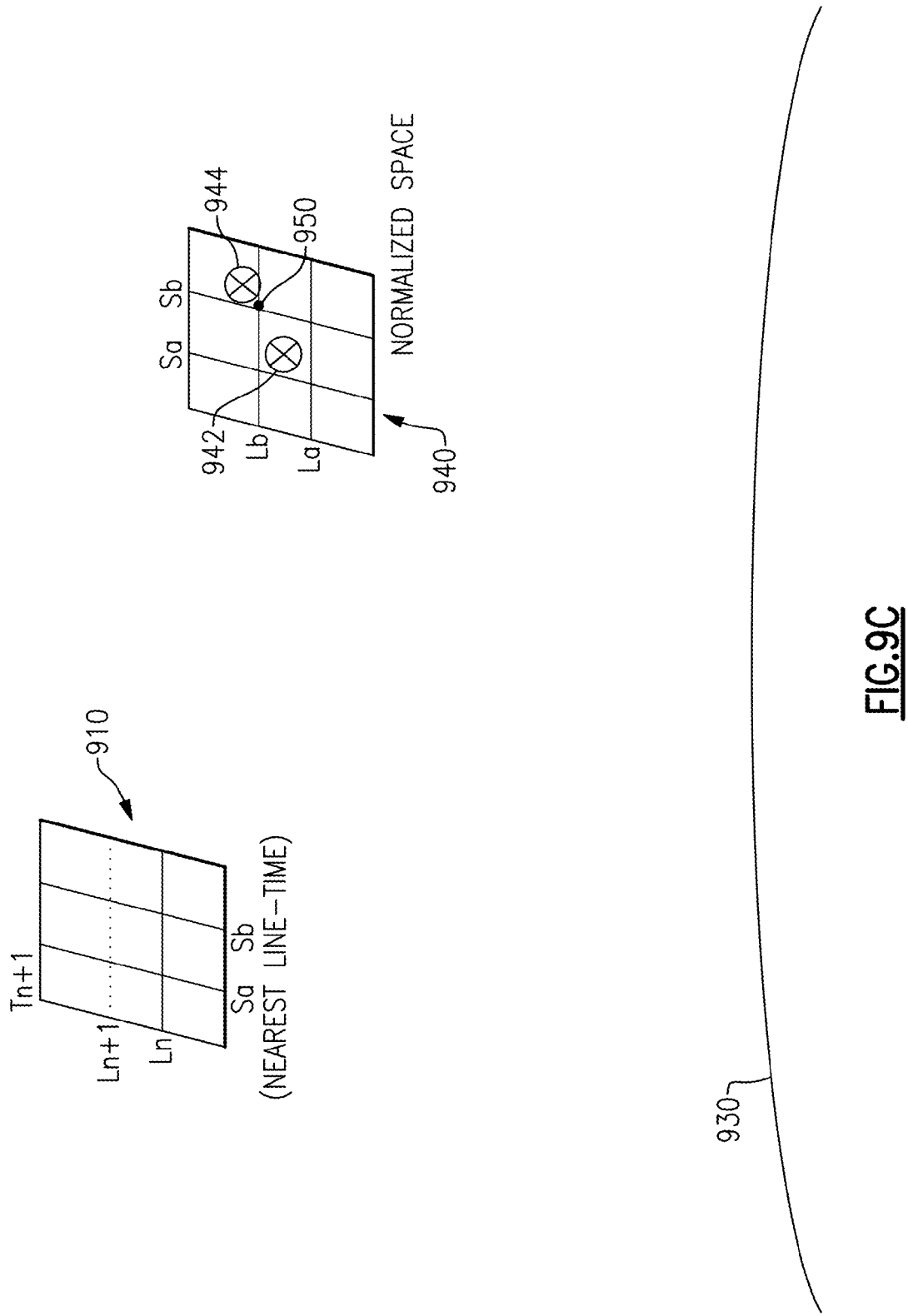

Referring to FIGS. 9A-9C, illustrated is one example of a process executed by the digital signal processor 508 for generating a DtoN mapping for initial pixels within the distorted image space. According to various aspects, the digital signal processor 508 utilizes a detection device model that projects a ray of received electromagnetic radiation from each sample of the imaging array 504, at each line-time to a ground reference 930. Subsequently, the digital signal processor 508 projects the ray 920 from the ground reference 930 to an idealized "virtual" focal plane 940 in a normalized image space, resulting in a mapping (e.g., DtoN_map) of the initial pixel to an idealized "normalized" image. While FIG. 9A illustrates one example of a DtoN mapping of a single initial pixel, similar processes may be executed for each pixel 512 of the imaging array 504. A simplified example of the forward projection between the distorted image space and the normalized image space is illustrated in FIGS. 9A and 9B. In FIG. 9A, a line "Ln" of the imaging array 504 is exposed at a line-time "Tn", and in FIG. 9B line "Ln+1" of the imaging array is exposed at a line-time "Tn+1".

FIG. 9A illustrates the projection of the ray 920, at time Tn, from a first sample "Sa" in the active line Ln of the imaging array 509 at the focal plane 910 positioned in the distorted image space. That is, an initial pixel at grid a position (Ln, Sa) on the focal plane 910 is projected to the ground reference 930 and subsequently projected to a "virtual" focal plane 940 in the normalized image space. In various examples, the normalized image space includes a reference grid at the virtual focal plane 940, referred to herein as the normalized reference grid. As illustrated in FIG. 9A, in many circumstances, the repositioned pixel will not fall directly on a grid corner of the normalized reference grid, and instead, maybe represented by a position 942 (La+l, Sa+s), with "l" being a distance in the vertical direction (e.g., y-dimension) between line La, and adjacent line "Lb", in the normalized image space, and "s" being a distance in the horizontal direction (e.g., x-dimension) between sample Sa, and adjacent sample "Sb", in the normalized image space. Thus, the mapping of the initial pixel position(s) to the repositioned pixel position in the forward projected direction from the distorted image space to the normalized image space at a line-time Tn, as performed by the digital signal processor 508, is represented by:

Distorted(*Sa,Ln*)=Normalized(*La*+l,*Sa*+*s*).

As noted above, at each line-time, the forward projection illustrated in FIG. 9A may be repeated by the digital signal processor 508 for each sample in line of the imaging array 508. Once an entire line of the imaging array 504 is projected to the normalized image space (e.g., the normalized reference grid of the virtual focal plane 940), the digital signal processor 508 may then forward project each sample in the next active line at the next time point. For example, FIG. 9B shows an example of the forward projection of a sample "Sa" at a next line-time "Tn+1", in which line "Ln+1" is active. As shown in FIG. 9B, the sample Sa is projected to a position 944 represented by a position (Lb+1, Sb+s) in the normalized image space. Accordingly, the repositioned pixel positions for the forward projection from the distorted image space into the normalized image space for the line-time Tn+1 is represented by:

Distorted(*Sa,Ln*+1)=Normalized(*Lb*+1,*Sb*+*s*).

Accordingly, the digital signal processor 508 may forward project each sample at each line-time of the imaging array 504 to reproduce the image collected by the imaging array 504 in the distorted image space, in the normalized image space. Thus, the virtual focal plane 940 in the normalized image space may be an idealized focal plane having an instantaneous exposure for all lines of the imaging array 504. In such a manner, the digital signal processor 508 may produce the DtoN mapping.

Accordingly, the DtoN mapping produced by the digital signal processor 508 reveals where an initial pixel in the distorted image space is repositioned in the normalized image space. Given this information, the digital signal processor 508 may execute one or more processes to resample the original distorted image into the normalized image space and create an estimate of an image corrected for the distortion caused by the moving platform. However, in some instances, the repositioned pixels in the normalized image space may not be regularly spaced relative to each other. In such situations, the digital signal processor 508 may execute a sparse resampling process to compensate for the non-regularly spaced pixels. In one example, the digital signal processor 508 executes a process for triangulization and resampling the distorted image into a regular normalized image space.

In certain examples, to improve resampling results, the digital signal processor 508 may execute a process that relies on the DtoN mapping to prime the creation of a map from the normalized image space back into the distorted image space, referred to herein as a "NtoD_map" or "NtoD mapping" (normalized image space to distorted image space map). This has the advantage of using interpolation/resampling techniques that operate on regularly sampled data (e.g., the image at the distorted image space) to resample the repositioned pixel data into the distorted image space. In particular, the NtoD mapping provides information from which the digital signal processor 508 may determine the particular initial pixels to pull from the distorted image space in order to achieve a normalized-space repositioned pixel.

However, as noted above and as shown in FIG. 9C, the projected pixel positions (e.g., repositioned pixels 942 and 944) in the normalized image space do not necessarily fall on the grid corners of the normalized reference grid. Furthermore, because the virtual focal plane 940 is an idealized focal plane having an instantaneous exposure of all lines, and because certain repositioned pixels may fall between grid lines, it may not be immediately apparent which samples correspond to which line-times. Thus, referring to FIG. 9C, it is desirable to know where normalized pixels (e.g., normalized pixel 950 (Lb, Sb)) are located in the distorted image space when projected back to the focal plane 910. Accordingly, in certain examples the digital signal processor 508 may execute one or more processes of disambiguating pixels collected from different shutter times (line-times) for use in correcting image distortion.

In particular, the digital signal processor 508 may estimate a corrected image that can be used with space-based linear imaging arrays to determine an NtoD mapping using line-time iteration to find the ground point between two given lines. This process involves virtually propagating the platform (e.g., satellite) position (and thus the focal plane 910 position) at the time at which the ground point projects onto the imaging array 504. As discussed, for a push-broom system, satellite-position/attitude, ground-projection, and lines are all correlated, and interpolation may simply be executed based on the known correlations. However, for a framing sensor with a rolling-shutter, interpolation processes are not as simple. That is, not only is each line shifted in time, but the ground projection of each line does not necessarily follow the ground projection of the satellite line-of-sight velocity (for example, as in the case of the skew distortion illustrated in FIG. 4). Thus, finding the location/attitude of the platform to intercept a single ground point would require searching a multi-dimensional space, which can be computationally challenging.

Accordingly, in certain examples the digital signal processor 508 identifies the time at which a repositioned pixel in the normalized image space is collected (e.g., by the imaging array 504) by estimating the line-time using the DtoN mapping as a seed. As discussed further below with reference to FIGS. 10A-10F, in one example the DtoN mapping is used to find the nearest line-time for each repositioned pixel. The repositioned pixel at that line-time is referred to as a normalized pixel and shown in FIG. 10A as normalized pixel 950. A ray is then back-projected from the normalized pixel 950 on the virtual focal plane 940 to the ground reference 930 and back into the distorted focal plane 910 for that line-time. This process provides a location between two lines on the distorted focal plane 910. The digital signal processor 508 may repeat this process for the next-nearest line-time, resulting in a new point on the distorted focal plane 910. In various examples, the digital signal processor may find the best approximation of the location for interpolation of the distorted image by taking an average of the two positions on the distorted focal plane 910, or by performing a weighted average of the two points weighted by their respective distances from the desired sample point in the normalized image space. Performing this process for each repositioned pixel produces the NtoD mapping. Once the NtoD mapping has been generated, interpolation can be directly performed on the distorted image to produce an estimated corrected normalized image.

Figure 10A:
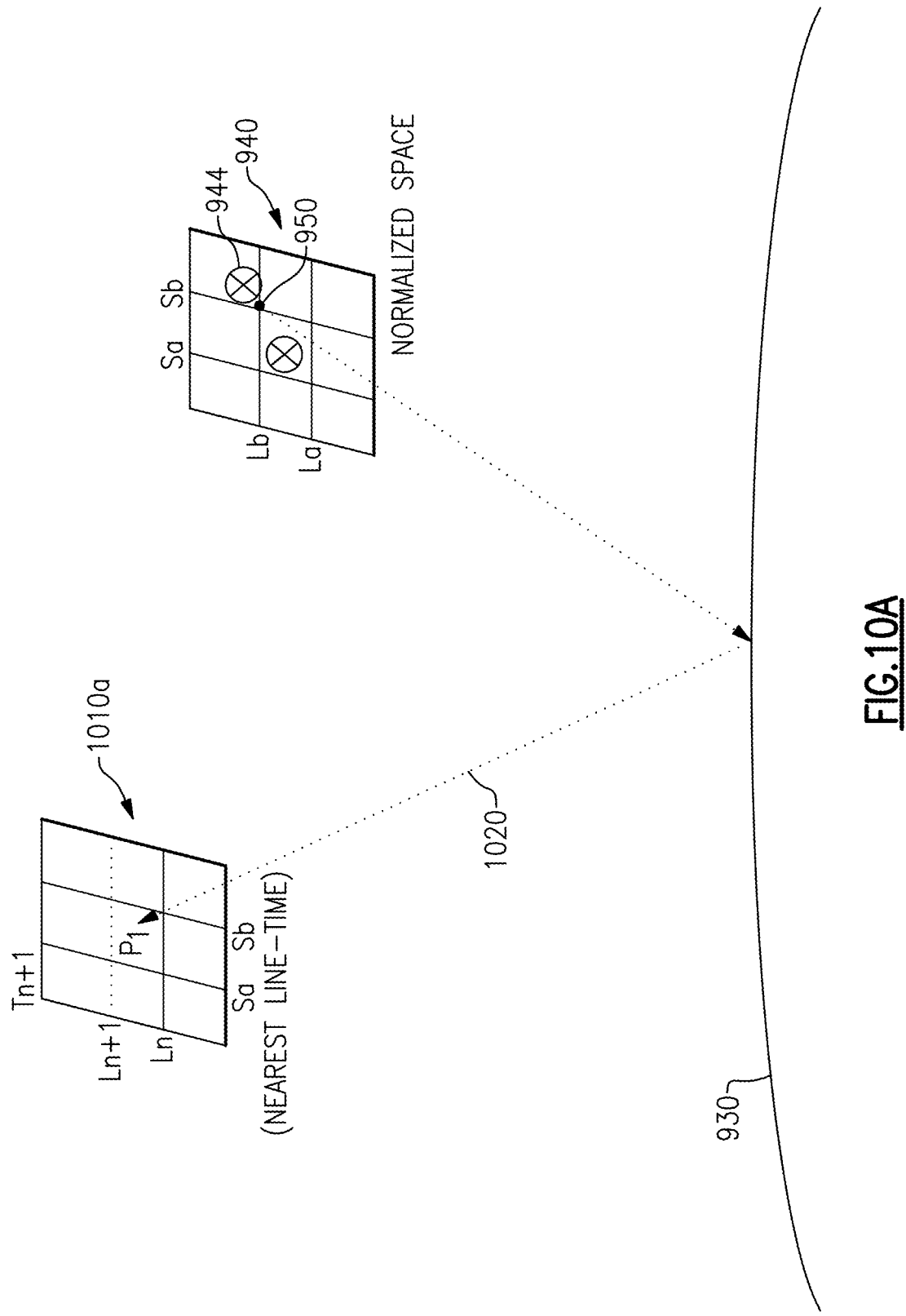
FIGS. 10A-10F illustrate a process for developing an NtoD mapping and correcting geometric distortion in imagery collected by an imaging array, according to various examples discussed herein.

Various examples of processes for developing the NtoD mapping for a repositioned pixel (Lb, Sb) in normalized image space is described with reference to FIGS. 10A-10F. Using the DtoN_map, the nearest line-time to a desired pixel is located. Referring to FIG. 10A, for the normalized pixel 950, the nearest line-time is "Tn+1" because the projected sample position 944 that corresponds to line-time Tn+1 is closer to the desired normalized pixel 950 than the repositioned pixel position 942 that corresponds to the line-time "Tn" (shown in FIG. 10B). Thus, the digital signal processor 508 back-projects a first ray 1020 from the normalized pixel 950 at the virtual focal plane 940 to the ground reference 930, and to a distorted focal plane 1010a at the nearest line-time. The back-projection results in a first position, p1, recorded on the distorted focal plane 1010a. Thus, as shown in FIG. 10A:

Nearest Line-Time for Normalized($Lb,Sb$)=$Tn$+1

Referring to FIG. 9B, the next-nearest bounding line-time can then be determined from the location on the focal plane 1010a and the ground point. Thus, a second ray 1030 from the normalized pixel 950 is back-projected from the virtual focal plane 940 to the same point on the ground reference 930, and back-projected to a distorted focal plane 1010b at the next-nearest line-time (e.g., line-time Tn). This results in a second position, p2, on the distorted focal plane 1010b. Thus, as shown in FIG. 9B:

Next Nearest Line-Time for Normalized($Lb,Sb$)=$Tn$

Figure 10B:
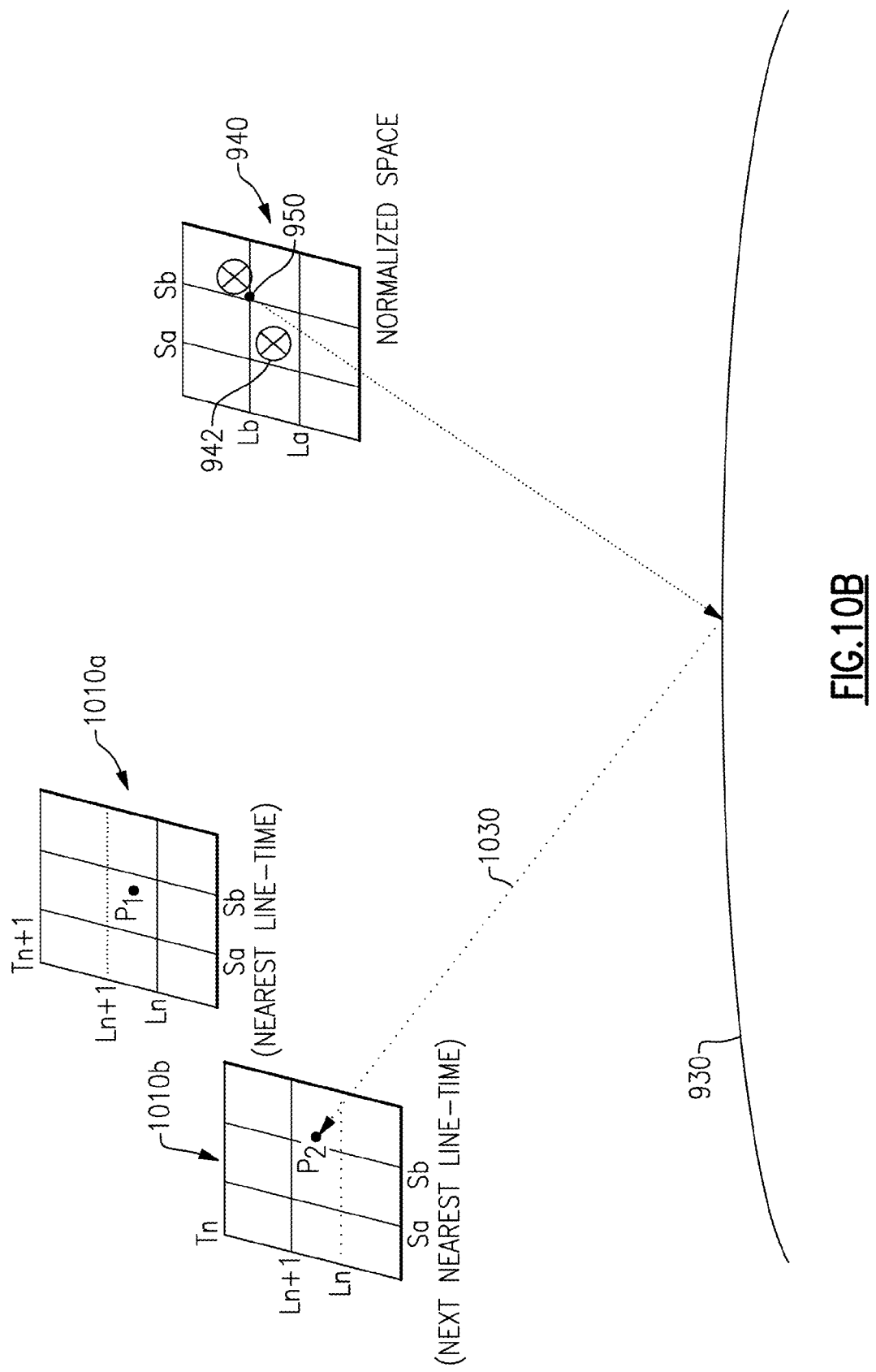
Figure 10C:
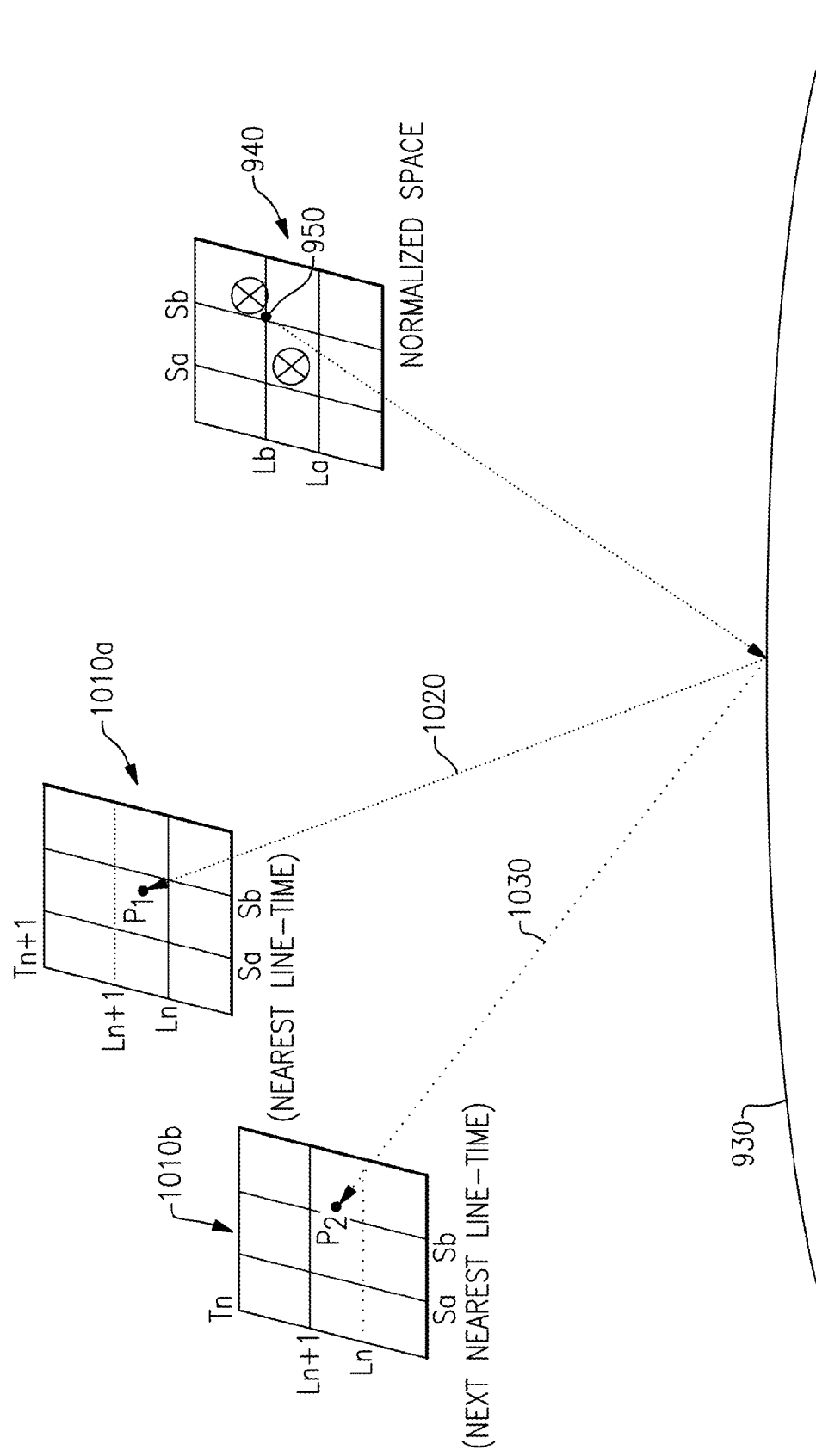
Figure 10D:
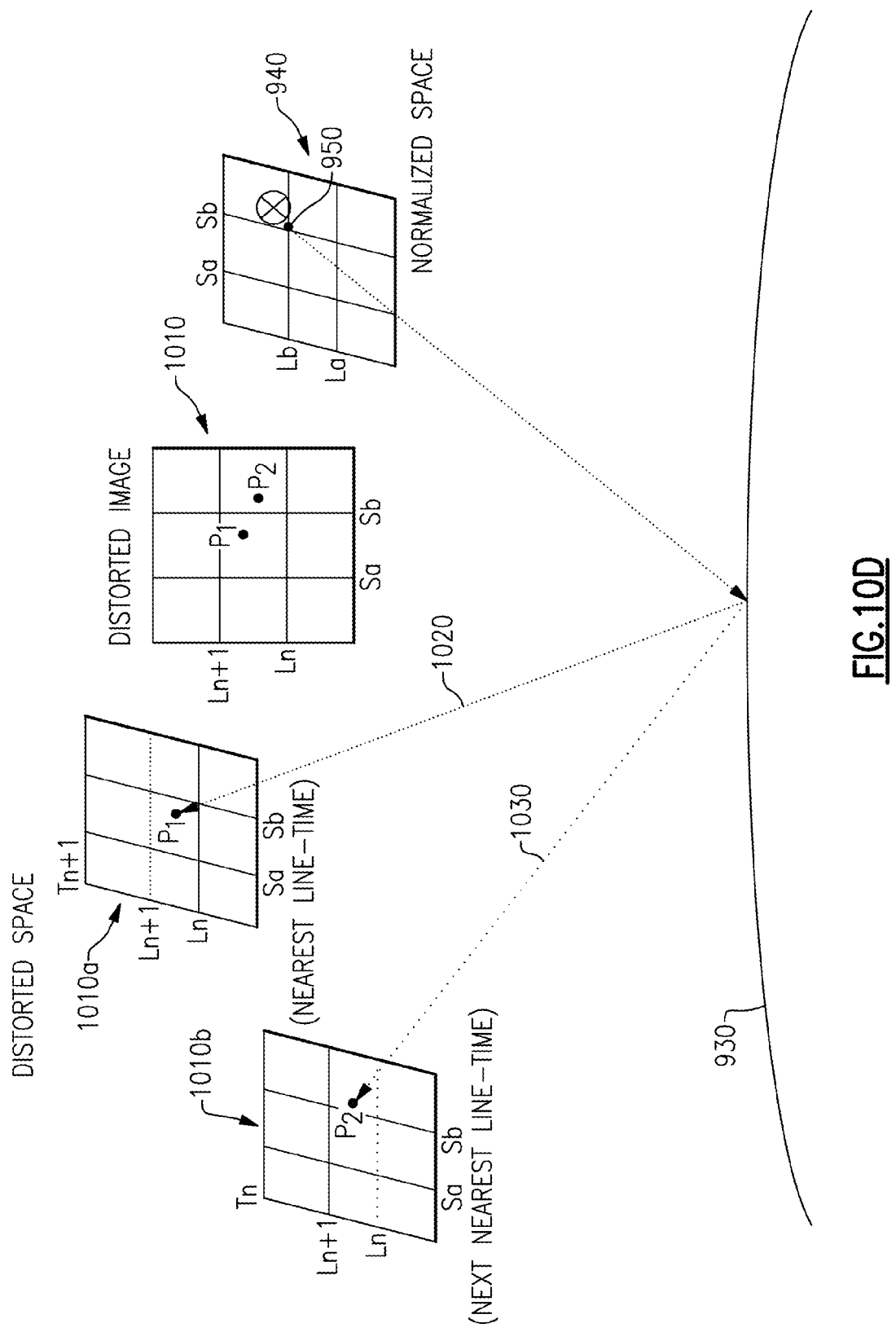
Figure 10E:
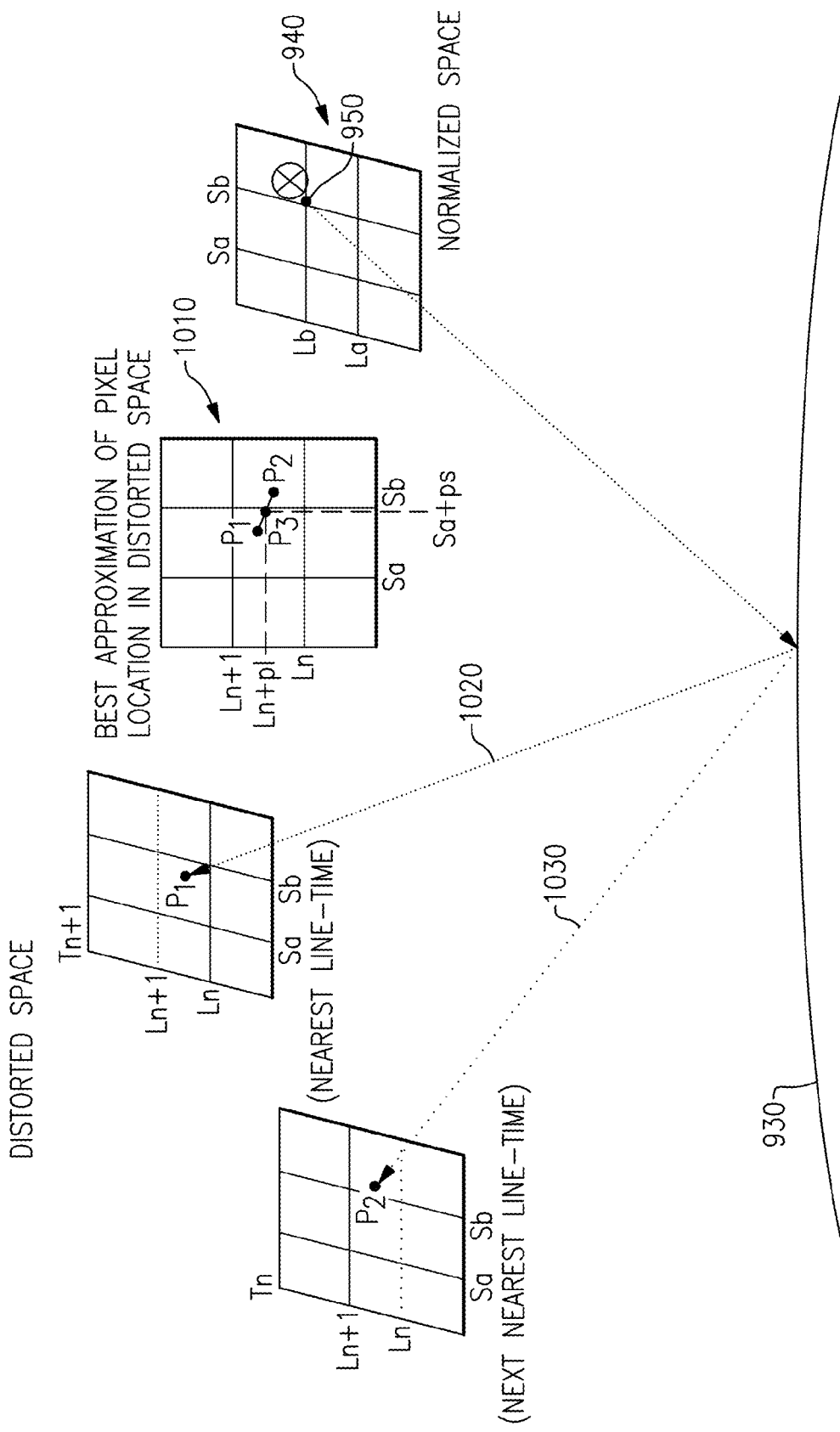

Referring to FIG. 10C, illustrated is a combination of the back-projections shown in FIGS. 10A and 10B. Referring to FIG. 10D, as illustrated, some ambiguity exists at the distorted image plane 1010 because positions p1 and p2 do not fall exactly on-top of each other in the distorted image space. Accordingly, in one example the digital signal processor 508 is configured to disambiguate the positions p1 and p2 by averaging the location of the positions p1, p2. For example, referring to FIG. 10E, the digital signal processor 508 averages the two positions p1 and p2 to produce a third position, p3. Position p3 is the best approximation for the projected position of the pixel corresponding to the ground point on the distorted focal plane 1010.

Figure 10F:
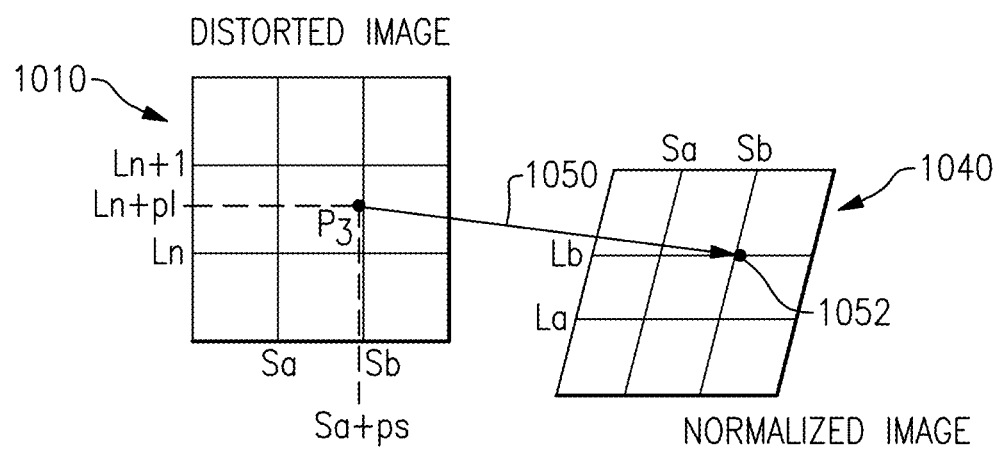

Referring to FIG. 10F, the approximate position p3 is then mapped by the digital signal processor 508 back to the normalized pixel 950 on the virtual focal plane 940 (indicated by ray 1050). The process can be repeated for each pixel 512 of the imaging array 504 illustrated in FIG. 5 to produce a normalized image 1040. Thus, Normalized($Sb,Lb$)=Distorted($Ln+p1,Sa+ps$)

Figure 11:
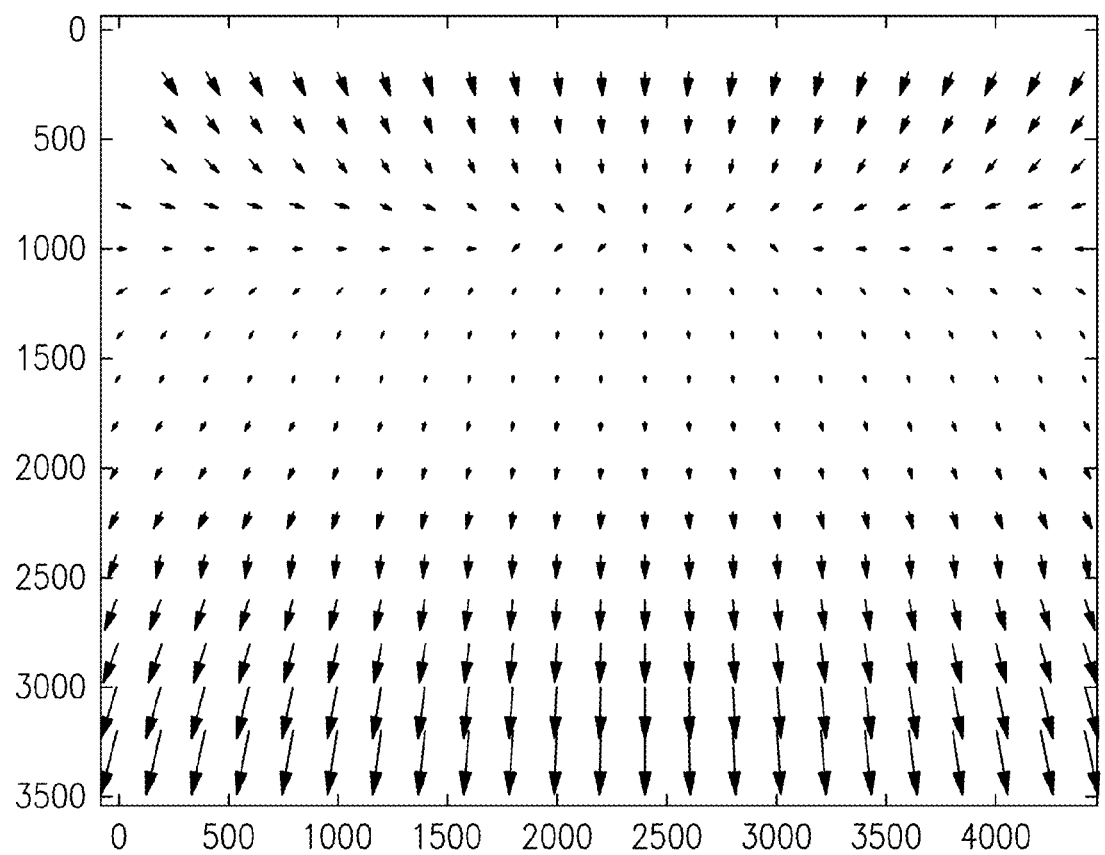
FIG. 11 is an illustration of an NtoD mapping according to various examples discussed herein.

FIG. 11 is a diagram illustrating one example of an NtoD mapping showing pixel movement between the normalized image space and the distorted image space for the collected imagery used to produce the DtoN mapping illustrated in FIG. 8. Each arrow indicator within the NtoD mapping shows the movement of a pixel 572 relative to the other pixels 572 of the imaging array 504. That is, FIG. 11 illustrates how the digital signal processor 508 moves a distorted pixel to produce a normalized image. Once the digital signal processor generates the NtoD mapping, the digital signal processor 508 may execute one or more techniques, such as bicubic resampling, for example, to resample the distorted image 1010 to the normalized image 1040. Accordingly, based on the NtoD mapping the digital signal processor 508 may resample the normalized image to produce an image corrected for distortion caused by movement of the platform.

Thus, aspects and examples discussed herein provide an imaging system and an associated method for correcting geometric distortion induced by rolling-shutter operation of high velocity framing sensors. As discussed above, according to certain embodiments, a DtoN_map is produced and used to seed a search for the bounding line-times of each desired idealized pixel in a normalized image space. Ambiguity in the pixel positions may be reduced through the identification of two (or more) possible locations relative to two (or more) distinct imaging times and positions, and the average calculation (weighted or unweighted) of the two (or more) possible locations for a best approximation for the pixel location. The best approximation can then be used to perform interpolation and resampling to produce a corrected image.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only. It is to be appreciated that embodiments of the methods and apparatuses discussed herein are not limited in application to the details of construction and the arrangement of components set forth in the description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

What is claimed is:

1. A method of correcting for geometric distortion in imagery collected by a rolling-shutter framing sensor, the method comprising:
    collecting initial pixels by exposing sequential lines of the rolling-shutter framing sensor over a frame time, each line being exposed at a corresponding line-time;
    developing a first mapping from a distorted image space to a normalized image space for the initial pixels of the rolling-shutter framing sensor;
    developing a second mapping from the normalized image space to the distorted image space for repositioned pixels in the normalized image space based on the first mapping, including:
        determining a nearest line-time corresponding to each of the repositioned pixels based on the first mapping, the repositioned pixels corresponding to the initial pixels of the rolling-shutter framing sensor,
        projecting each of the repositioned pixels to a ground reference and back to a distorted focal plane in the distorted image space at the nearest line-time to provide a first estimated pixel position in the distorted image space,
        determining a next-nearest line-time corresponding to each of the repositioned pixels based on the first mapping, and
        projecting each of the repositioned pixels to the ground reference and back to the distorted focal plane in the distorted image space at the next-nearest line-time to provide a second estimated pixel position;
    producing a normalized image based on the repositioned pixels and the second mapping; and
    resampling the normalized image to produce a corrected image of the imagery collected by the rolling-shutter framing sensor.

2. The method of claim 1 wherein developing the first mapping includes mapping a geodetic location of each ground-point in the ground reference to at least one of the repositioned pixels.

3. The method of claim 2 wherein developing the first mapping includes:
    projecting each of the initial pixels from the distorted image space to the ground reference; and
    projecting each of the initial pixels from the ground reference onto an idealized focal plane in the normalized image space.

4. The method of claim 3 wherein the idealized focal plane is positioned at a mean ephemeris and altitude of the imagery collected by the rolling-shutter framing sensor.

5. The method of claim 3 wherein the idealized focal plane has an instantaneous exposure to each of the initial pixels of the rolling-shutter framing sensor.

6. The method of claim 1 further comprising averaging the first estimated pixel position and the second estimated pixel position to produce an approximate position for each repositioned pixel on the distorted focal plane.

7. The method of claim 1 wherein resampling the normalized image to produce the corrected image includes bicubic resampling the normalized image.

8. A spaced-based platform imaging system, the imaging system comprising:
    an imaging array having an array of pixels arranged in a series of independently addressable lines, the imaging array being configured to sequentially activate each line of pixels to collect and integrate photons of electromagnetic radiation received at the imaging array;
    a read-out integrated circuit (ROIC) coupled to the imaging array and configured to deactivate each sequentially activated line of pixels and read out a value of the pixels therein; and
    a control system coupled to the read-out integrated circuit to receive the value of each pixel and generate imagery based on the received electromagnetic radiation, the control system including a digital signal processor configured to:
        develop a first mapping from a distorted image space to a normalized image space for initial pixels of the imaging array,
        develop a second mapping from a normalized image space to the distorted image space for repositioned pixels in the normalized image space based on the first mapping, the repositioned pixels corresponding to the initial pixels of the imaging array, produce a normalized image based on the repositioned pixels and the second mapping, and resample the normalized image to produce a corrected image of the imagery generated based on the received electromagnetic radiation.

9. The imaging system of claim 8 wherein the imaging array is a rolling-shutter framing sensor.

10. The imaging system of claim 8 wherein in developing the first mapping, the digital signal processor is configured to map a geodetic location of each ground-point in a ground reference to each of the repositioned pixels.

11. The imaging system of claim 10 wherein in developing the first mapping, the digital signal processor is configured to project each of the initial pixels from the distorted image space to the ground reference, and project each of the initial pixels from the ground reference onto an idealized focal plane in the normalized image space.

12. The imaging system of claim 11 wherein the idealized focal plane is positioned at a mean ephemeris and altitude of the electromagnetic radiation collected by the imaging array.

13. The imaging system of claim 12 wherein the idealized focal plane has an instantaneous exposure to each of the initial pixels of the imaging array.

14. The imaging system of claim 8 wherein the imaging array is further configured to sequentially activate each line of pixels for a corresponding line-time.

15. The imaging system of claim 14 wherein in developing the second mapping, the digital signal processor is configured to:

determine a nearest line-time corresponding to each of the repositioned pixels using the first mapping;

project each of the repositioned pixels to the ground reference and back to a distorted focal plane in the distorted image space at the nearest line-time to provide a first estimated pixel position;

determine a next-nearest line-time corresponding to each of the repositioned pixels using the first mapping; and project each of the repositioned pixels to the ground reference and back to the distorted focal plane at the next-nearest line-time to provide a second estimated pixel position.

16. The imaging system of claim 15 wherein the digital signal processor is further configured to average the first estimated pixel position and the second estimated pixel position to produce an approximate position for each repositioned pixel on the distorted focal plane.

17. The imaging system of claim 8 wherein the digital signal processor is further configured bicubic resample the normalized image to produce the corrected image.

* * * * *